April 27, 1926.  1,582,156
H. BAUM
FRUIT JUICE EXTRACTOR AND STRAINER
Filed Sept. 21, 1925
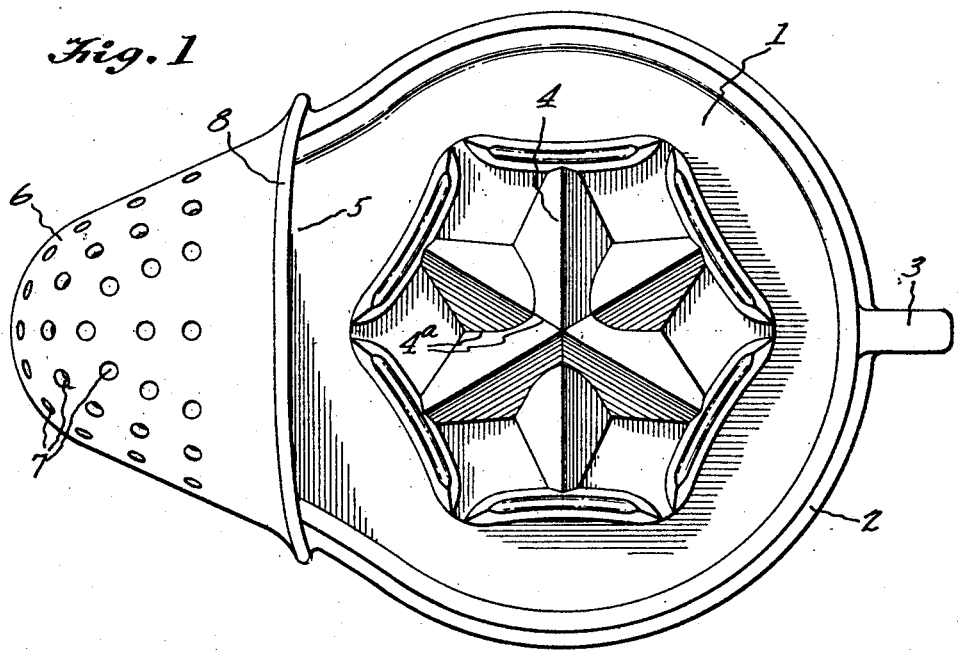
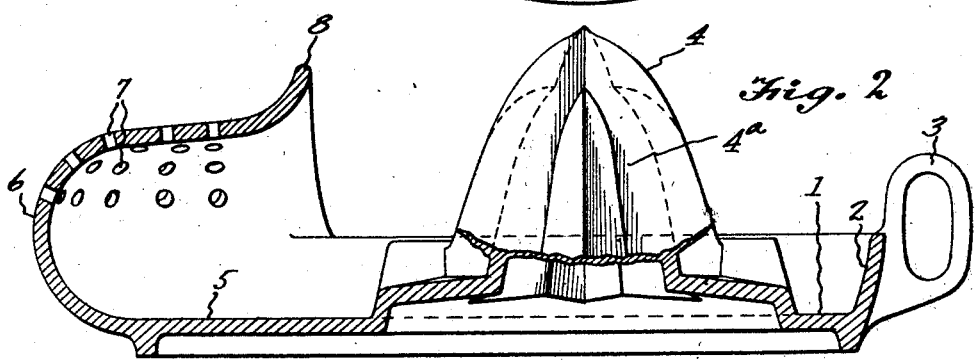
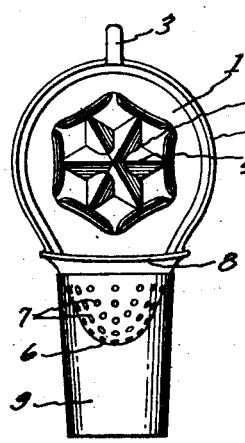
INVENTOR
Henry Baum
BY John A. Bommhardt
ATTORNEY Patented Apr. 27, 1926.

1,582,156

UNITED STATES PATENT OFFICE.

HENRY BAUM, OF EAST CLEVELAND, OHIO.

FRUIT-JUICE EXTRACTOR AND STRAINER.

Application filed September 21, 1925. Serial No. 57,698.

*To all whom it may concern:*

Be it known that I, HENRY BAUM, a citizen of the United States, residing at East Cleveland, in the county of Cuyahoga and State of Ohio, have invented certain new and useful Improvements in Fruit-Juice Extractors and Strainers, of which the following is a specification.

This invention relates to fruit juice extractors and strainers, and more particularly to that type adapted for ordinary household or soda fountain use.

The object of the invention is to provide a unitary device capable of extracting and straining the juices of oranges, lemons and the like in order that the same may be used for beverage or other purposes. The different parts of the device are so arranged that each cooperates with the others to accomplish the desired result. The invention provides an improved article of manufacture that can be cheaply made and easily cleaned.

The invention is illustrated in the accompanying drawings, in which—

Figure 1 is a plan view of the device;

Figure 2 is a sectional elevation thereof; and

Figure 3 is a view of the device applied to a tumbler or other container.

Referring specifically to the drawings, 1 indicates the base of the body of the device, having an annular wall 2 and handle 3. Integral with and projecting up from the center of base 1 is an extractor member 4 which is substantially pyramidal in shape and has grooves 4ª therein.

The base 1 is extended at 5 to form a straining funnel 6 having perforations 7 and flared edge 8. Figure 3 illustrates this strainer inserted in a tumbler 9, the flared part 8 thereof engaging the rim of the tumbler.

The entire device may be made from a single piece of material, preferably glass.

The device may be used as follows: The user may grasp base 1 or handle 3 or both and, holding the base in a vertical position force a half orange on juice extractor 4 in the well-known manner. The juice extracted will run down in the dish formed by base 1 and annular wall 2 and thence through strainer 6 into any suitable container. Thus the base of the extractor may be used as a handle for the strainer.

Again, the user may place the device on a table or the like in the position shown in Figure 2, and extract juice by means of extractor 4, in which case the juice will collect in the dish formed by base 1 and annular wall 2. The device may be held in position by grasping handle 3, the sides of base 1, or strainer 6. Thus the strainer may be used as a handle for the extractor. The perforations are too high for the juice to escape therethrough when in horizontal position. The device may then be turned up to the position shown in Figure 3 to strain the juice extracted.

If desired a small amount of water may be used to clean the device by pouring the same on the extractor. The water so poured will clean the extractor, dish and strainer and also remove to the container the juice left upon the surfaces of the members, the amount of water necessary for this purpose being too small to appreciably dilute the pure juice in the container.

I claim:

A combined juice extractor and strainer of the type described, comprising a dish having a strainer formed integral with the side wall thereof, said strainer being substantially conical in shape and having an outwardly flared edge on the side thereof opposite the bottom of the dish.

In testimony whereof, I affix my signature.

HENRY BAUM.